United States Patent

[11] 3,625,760

[72] Inventor Manuel Slovinsky
Woodridge, Ill.
[21] Appl. No. 14,944
[22] Filed Feb. 27, 1970
[45] Patented Dec. 7, 1971
[73] Assignee RCA Corporation

[54] MAGNETIC RECORDING MEDIUM WITH LUBRICANT
7 Claims, 1 Drawing Fig.

[52] U.S. Cl. .......... 117/235, 252/62.54
[51] Int. Cl. .......... H01f 10/02
[50] Field of Search .......... 117/235, 239, 240, 236, 237; 252/62.54; 260/429.7

[56] References Cited
UNITED STATES PATENTS

| | | | |
|---|---|---|---|
| 3,510,489 | 5/1970 | Graham et al. ............... | 117/235 X |
| 3,523,086 | 8/1970 | Bisschops et al. ............. | 252/62.54 |
| 3,490,945 | 1/1970 | Slovinsky ..................... | 117/235 |
| 3,384,506 | 5/1968 | Elkin ............................ | 117/161 X |
| 3,445,423 | 5/1969 | Sunshine et al. .............. | 117/161 X |

FOREIGN PATENTS

| | | | |
|---|---|---|---|
| 1,150,887 | 5/1969 | Great Britain ................ | 117/235 UX |

*Primary Examiner*—William D. Martin
*Assistant Examiner*—Bernard D. Pianalto
*Attorney*—Glenn H. Bruestle

ABSTRACT: A magnetic recording media, such as magnetic tape, includes as a lubricant a stannous salt of an aliphatic acid containing at least eight carbon atoms.

PATENTED DEC 7 1971 3,625,760
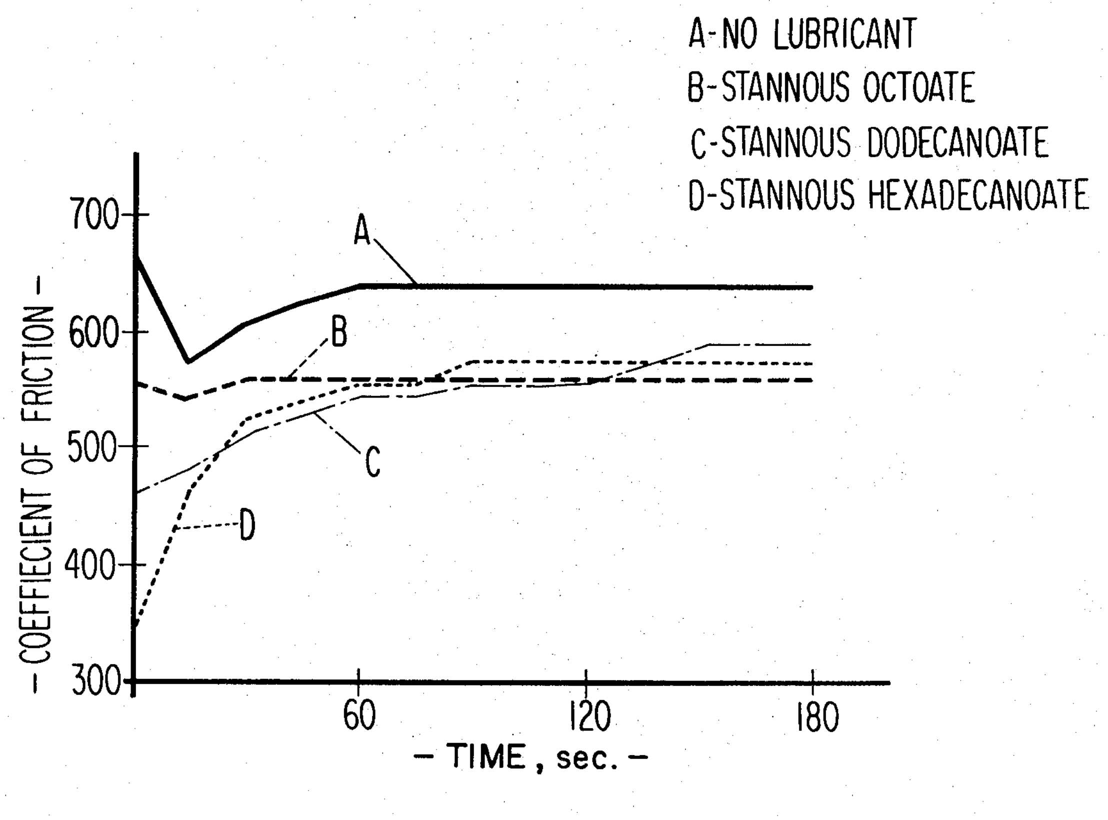
INVENTOR
Manuel Slovinsky
BY
ATTORNEY

MAGNETIC RECORDING MEDIUM WITH LUBRICANT

BACKGROUND OF THE INVENTION

This invention relates to magnetic recording media, and more particularly to a lubricant for magnetic recording media.

In magnetic tape apparatus such as that used for video recording, or in conjunction with computers, the relative velocity between the magnetic recording media and the magnetic head is extremely high. This high velocity results in the abrasion and reduced life of the magnetic recording media and abrasion of the magnetic head. Consequently, tape and magnetic head wear are important aspects of the magnetic tape performance. In order to decrease the problems of tape and head wear, various lubricants have been incorporated in or used in conjunction with the magnetic tape.

Other problems related to lack of proper lubrication also exist. One problem that arises with lack of proper lubrication manifests itself in a stick-slip motion of the tape as it passes the magnetic heads. This motion brings about a distortion of the magnetic signal which distortion is termed scrape-flutter.

Still another problem of lack of proper lubrication is what is termed, "squeal." Squeal, as it implies, is an audible, generally high-pitched noise which occurs as a result of physical resonance of the magnetic tape as it passes or comes in contact with tape guides or magnetic heads during operation of the magnetic tape equipment.

SUMMARY OF THE INVENTION

A magnetic recording element comprising a magnetic coating on a nonmagnetic base and including as a lubricant for said coating, at least one stannous salt of an aliphatic acid having at least eight carbon atoms.

BRIEF DESCRIPTION OF THE DRAWING

The FIGURE is a graph showing the change of coefficients of friction with respect to time in tapes containing various lubricants.

DESCRIPTION OF THE PREFERRED EMBODIMENTS

A magnetic recording media comprises a magnetic coating on a nonmagnetic base. In accordance with the invention there is provided a stannous salt of an aliphatic acid having at least eight carbon atoms as a lubricant for the magnetic recording media. The aliphatic acid salt may be saturated or unsaturated salt. Such salts may be produced by the reaction between the aliphatic acid with stannous hydroxide.

The lubricant is preferably incorporated in the magnetic coating composition prior to forming the coating on the nonmagnetic substrate. However, as is known in the art, lubricants can be applied in other ways for example, as a coating upon the magnetic coating. The magnetic coating composition includes a particulate magnetic material such as gamma iron oxide and a binder formulation. Any of the usual binder materials generally employed in the production of recording media can be used, and in general in the same proportions as normally used. Polyvinylchloride, polyvinyl acetate, polyacrylic esters and copolymers containing vinyl chloride, vinyl acetate or butyl acrylate may be used. However, it is preferred to include the lubricants disclosed herein in polyurethane type binders and particularly in diisocyanate terminated prepolymers. Mixtures of two or more binders are also useful. Other additives may also be incorporated in the novel recording elements. For example, the art often includes fungicides as part of the coating formulation.

The stannous salts are particularly useful for polyurethane binder systems which are derived from moisture curing of isocyanate terminated prepolymers. It has been found that the stannous salts are chemically inert to isocyanate groups under tape fabrication conditions and furthermore that they are moderate catalysts for the reaction of isocyanate groups with water. This latter property is desirable because it causes acceleration of the curing process.

A measure of the efficiency of the stannous salts as lubricants for magnetic tape is shown with reference to the FIGURE. This efficiency manifests itself in a decrease of both the static and dynamic coefficients of friction as shown in the FIGURE.

The values as shown in the FIGURE were obtained with use of a model CS 131 frictionometer manufactured by Custom Scientific Instruments. In this frictionometer a loop of tape rotates against a circular probe that measures the drag from which the dynamic coefficient of friction can be found. On displacement of the probe while the tape is stationary, it normally fails to return to its equilibrium position because of frictional forces. The deviation from the equilibrium position is a measure of the static coefficient of friction. The probe used for taking measurements was made of Alfecon, a material frequently used in magnetic heads.

The FIGURE shows the values of the static coefficient of friction (time=0) and the dynamic coefficients of friction as a function of time. The tapes were displaced at a linear speed of 150 cm./sec. The FIGURE shows a marked decrease in both the static and dynamic coefficient of friction in comparison with a similar tape containing no lubricant.

Examination of the alfecon probe after 5 minutes gives an indication of the abrasiveness of the tapes. It was found by such examination that a notable decrease in metal wear of the probe was seen with tapes containing stannous dodecanoate or stannous hexadecanoate as compared with a nonlubricated tape.

Another measure of the effect of lubrication of magnetic tapes with the stannous salts as disclosed herein is manifested by scrape-flutter. Scrape-flutter, as measured here, is the distortion of a 15 kHz. carrier wave. This distortion is due in part to the frictional behavior of the tape against the stationary elements of the tape transport. It is expressed as the percent deviation in frequency, measured at a particular frequency, in this case 600 Hz. The improvement in scrape-flutter produced by the lubricants disclosed herein when used in tapes containing polyurethane type binders, is shown below.

| Lubricant | Scrape-flutter | wt% lub. |
|---|---|---|
| No lubricant | 0.060 | 0 |
| Stannous dodecanoate | 0.022 | 3 |
| Stannous octoate | 0.024 | 4 |
| Stannous hexadecanoate | 0.024 | 6 |

Still another measure of the effect of the lubricants disclosed herein is that of squeal. Tests of various lubricants incorporated in the magnetic coating formulation of a magnetic tape having 40–60 percent of a polyester and from 60–40 percent of a polyurethane plus wetting agents and crosslinking agents in minor amounts were used for these tests. Materials tested included: fatty esters such as lauryl laurate; fluorolubes, as produced by the Hooker Chemical Company; silicones; aluminum stearate; and stannous dodecanoate. Of these lubricants only stannous dodecanoate eliminated tape squeal. The quantity of stannous dodecanoate incorporated in these tapes generally ranged from about one quarter to 2 weight percent of the magnetic composition.

It has generally been found that the preferred weight percent of lubricant in the magnetic composition is from one quarter to 6 weight percent based upon total solids.

The useful stannous salts of aliphatic acids contain at least eight carbon atoms and may contain many more than the eight carbon atoms. However, salts containing from eight–18 carbon atoms are preferred. Examples of other useful salts includes the stannous salts of: undecylenic acid, decanoic acid and tetradecanoic acid.

I claim:

1. A magnetic recording element comprising a magnetic coating on a nonmagnetic base said magnetic coating comprises magnetic particles dispersed in a resin binder and contains a stannous salt of an aliphatic acid having from eight–18 carbon atoms, in an amount sufficient to lubricate said coating.

2. The magnetic recording element recited in claim 1 wherein said lubricant is stannous dodecanoate.

3. In the magnetic recording element recited in claim 1, said resin hinder includes polyurethane resin and wherein said lubricant is stannous dodecanoate.

4. In the magnetic recording element of claim 1 in which said stannous salt comprises from one quarter to 6 weight percent of said magnetic coating.

5. The magnetic recording element of claim 4 wherein said stannous salt is selected from the group consisting of stannous octoate, stannous decanoate, stannous dodecanoate, stannous tetradecanoate, and stannous hexadecanoate.

6. The magnetic recording element recited in claim 4 wherein said magnetic coating comprises magnetic particles dispersed in a binder and said binder includes as a major constituent thereof, a polyurethane resin.

7. The magnetic recording element recited in claim 6 wherein said polyurethane resin is derived from a diisocyanate terminated prepolymer, moisture cured in the presence of said lubricant.

* * * * *